(12) United States Patent
Wu et al.

(10) Patent No.: US 8,836,977 B2
(45) Date of Patent: Sep. 16, 2014

(54) MANAGING A RESOURCE CONSERVATION MODE AND PRINTING QUOTA

(75) Inventors: Yuwen Wu, Sunnyvale, CA (US); Jiang Hong, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 117 days.

(21) Appl. No.: 13/314,346

(22) Filed: Dec. 8, 2011

(65) Prior Publication Data

US 2013/0308147 A1    Nov. 21, 2013

(51) Int. Cl.
*G06F 3/12*    (2006.01)

(52) U.S. Cl.
USPC ........... 358/1.15; 358/1.9; 358/1.1; 358/1.14; 358/1.13

(58) Field of Classification Search
CPC . G06F 3/1218; G03G 15/553; G03G 21/1889
USPC .......................... 358/1.15, 1.1, 1.9, 1.13, 1.14
See application file for complete search history.

(56) References Cited

U.S. PATENT DOCUMENTS

| | | | |
|---|---|---|---|
| 5,933,584 A * | 8/1999 | Maniwa ........................ 358/1.15 |
| 5,933,587 A * | 8/1999 | Sakai et al. .................. 358/1.16 |
| 6,453,268 B1 * | 9/2002 | Carney et al. ................. 702/186 |
| 6,972,857 B2 * | 12/2005 | Mantell et al. ............... 358/1.14 |
| 7,715,029 B2 * | 5/2010 | Kayahara ..................... 358/1.13 |
| 7,856,202 B2 * | 12/2010 | Mizobuchi et al. ........... 399/389 |
| 8,270,027 B2 * | 9/2012 | Ban ................................ 358/1.9 |
| 8,400,661 B2 * | 3/2013 | Grasso et al. ................. 358/1.15 |
| 2002/0196460 A1 * | 12/2002 | Parry ............................ 358/1.15 |
| 2005/0231758 A1 * | 10/2005 | Reynolds ..................... 358/1.15 |
| 2008/0037058 A1 * | 2/2008 | Ban ............................... 358/1.15 |
| 2008/0240826 A1 * | 10/2008 | Shen ............................... 400/62 |
| 2009/0314837 A1 * | 12/2009 | Kataoka et al. ............... 235/385 |
| 2010/0161363 A1 * | 6/2010 | Nakane et al. ..................... 705/7 |
| 2010/0188681 A1 * | 7/2010 | Kawano ....................... 358/1.13 |
| 2011/0273739 A1 * | 11/2011 | Grasso et al. ................ 358/1.15 |

* cited by examiner

*Primary Examiner* — Dennis Dicker
(74) *Attorney, Agent, or Firm* — Hickman Palermo Truong Becker Bingham Wong LLP

(57) ABSTRACT

A print manager of a printing device is configured to retrieve a plurality of print options and features to be used to process a particular print job on the printing device, and to determine whether a resource conservation mode is specified for the printing device. In response to determining that the resource conservation mode is specified for the printing device, the print manager identifies, from the plurality of print options, one or more particular print options that are associated with the resource conservation mode, and generates a modified plurality of print options and features by changing a feature for each of the one or more particular print options to implement the resource conservation mode. In the resource conservation mode, the modified plurality of print options and features is used to process the particular print job to reduce an amount of consumable resources used to process the particular print job.

20 Claims, 5 Drawing Sheets

MANAGING A RESOURCE CONSERVATION MODE AND PRINTING QUOTA

FIELD OF THE INVENTION

The present invention relates to supporting network-based printing and, in particular, to defining and enforcing a resource conservation mode and quota-based rules for network-based printing.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Internet-based printing provides convenience and versatility. It allows submitting print jobs from any computer device with Internet access to an Internet-based service, and allows executing the submitted print jobs on any printer managed by the Internet-based service.

Internet-based printing solutions provide a broad range of services, including an ability to print on any network printer from applications, such as web applications, mobile applications and desktop applications. Examples of Internet-based printing solutions include the Google Cloud Printing (GCP) service.

However, conventional Internet-based printing solutions usually lack the ability to provide support for defining and enforcing various rules, such as the rules for printing in a resource conservation mode. Printing in a resource conservation mode is often referred to as green printing, and imposes restrictions on the amount of consumable printing resources used, such as paper and toner. Imposing green printing rules on printing using Internet-based printing services would allow printing that is mindful of the printing cost and the environment.

Furthermore, conventional Internet-based printing solutions usually lack the ability to enforce proper billing of the users who utilize network-connected printers. For example, conventional Internet-based printing solutions usually do not support quota-based billing rules for the usage of the printing paper or the usage of the color toners.

SUMMARY

Techniques are provided for implementing a resource conservation mode for printing on a printing device managed by a network print service.

Implementations of a resource conservation mode are designed to reduce the amount of consumable resources used for printing on a printing device. For example, when a resource conservation mode is specified for the printing device, a duplex option may be chosen to process the particular print job instead of a default single-page option. According to another example, if a resource conservation mode is specified, a black-and-white option may be chosen instead of a color option. Other print options that may be used to implement a resource conservation mode include an n-up option, a print density option, a recyclable paper option, and a toner usage.

Implementations of a resource conservation mode on a printing device may vary. According to one approach, a resource conservation mode is implemented in a print manager of a printing device. The print manager may be configured to detect if a resource conservation mode is specified on a printing device, and if so, to modify the settings for print options and features that are associated with a print job sent to the printing device to conform the settings to the resource conservation mode.

In particular, upon retrieving information about particular print options and features to be used to process a particular print job on a printing device, a print manager may determine whether a resource conservation mode is specified for the printing device. If so, then the print manager may identify, from a plurality of print options, one or more particular print options that are associated with the resource conservation mode, and may generate a modified plurality of print options and features by changing a feature for each of the particular print options to implement the resource conservation mode. The modified plurality of print options and features, not the particular plurality of print options and features previously associated with the particular print job, may be used to process the particular print job. By using the modified plurality of print options and features, the resource conservation mode may be enforced on the printing device.

According to another approach, a resource conservation mode is implemented without modifying the user-provided print options and features. In this approach, before a print job is created for a print device, a print manager of the printing device provides, to a network print service, data indicating the print options and features that comply with a resource conservation mode. The network print service uses the data to generate a user interface for a user. Using the user interface, the user selects particular print options and features and associates the selected particular print options and features with a particular print job. The particular print options and feature comply with the resource conservation mode implemented on the printing device, and are used to execute the particular print job on the printing device.

One of the differences between the first and the second approaches for implementing a resource conservation mode is that in the first approach, a user-provided set of options and features for a particular job may be modified to conform the set to the resource conservation mode, while in the second approach, a user-provided set of options and features associated with the particular job already conforms to the resource conservation mode. Thus, according to the second approach, the user-provided options and features do not require any modification to ensure the compliance with the resource conservation mode.

Stating differently, according to the first approach, compliance with a resource conservation mode is accomplished by modifying the user-provided settings for the options and features associated with a particular job, while according to the second approach, compliance with the resource conservation mode is already ensured in the user-provided settings for the options and features associated with the particular job.

In both approaches, a resource conservation mode may be configured on a printing device in advance. A resource conservation mode may be configured by providing to the printing device configuration data and settings indicating the options specific to the resource conservation mode. The resource conservation mode may be configured on a printing device by a system administrator, by network print services or by a process designed to modify a printer configuration.

Techniques are also provided for implementing printing quota rules on a printing device managed by a network print service. An implementation of the printing quota rules may be combined with the implementation of a resource conservation mode on the printing device. Alternatively, the printing quota rules and the resource consideration mode may be implemented on the printing device separately from each other.

Implementations of printing quota rules are designed to enhance billing procedures applicable to user accounts with respect to the user usage of printers managed by a network print service. For example, by implementing the printing quota rules, the system may accurately monitor the user usage of the printing resources, and reflect the user usage of the printing resources in the user billing and accounting.

Printing quota rules may be implemented in a print manager of a printing device managed by a network print service. In this approach, a print manager is configured to apply one or more printing quota rules to a user account associated with a particular print job to determine whether a print quota associated with the user account has been reached. In response to determining that the print quota associated with the user account has been reached, the print manager may determine that a particular print job cannot be executed on a particular printing device. For example, in response to determining that a print quota associated with a user account has been reached, a print manager may cancel the particular print job and send a cancellation notification that the particular print job has been cancelled.

A print quota may be associated with a user account and/or with a group of users. Furthermore, for each user account, one print quota may be determined for all printing devices that the user (or a group of users) may access. Alternatively, a separate print quota may be determined for each of the printing devices that the user (or a group of users) may access. Other methods of defining and specifying print quotas are contemplated.

A print quota may be periodically reset to an initial value. The print quota may be reset by a system process or a system administrator of a network print service. For example, upon determining that a user exhausted the print quota associated with the user account, the system process may determine whether the print quota may be increased, and if so, then the system process may increase the print quota for the user by a specified amount. The print quota increase may be determined based on the status of the user subscription to the network print service, or based on any other factors determined by the network print service.

A print quota may also be updated upon receiving a notification indicating that a particular print job was successfully processed. For example, if processing of a particular print job for a particular user specified printing a five-page-long document, then the print quota associated with the particular user may be adjusted to reflect the usage of the printing resources to print the five-page-long document.

DETAILED DESCRIPTION

Figure 1:
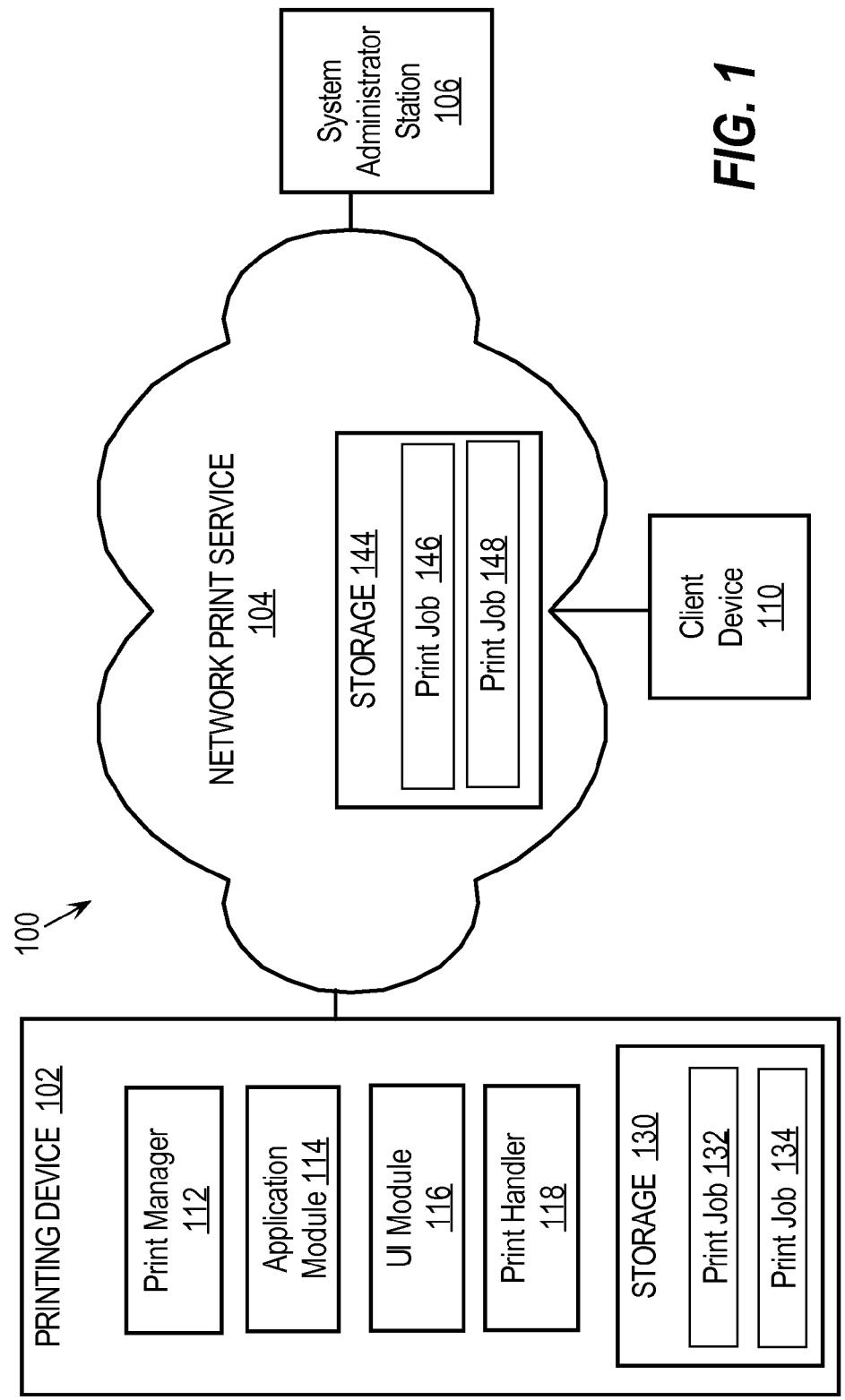
FIG. 1 is a block diagram that depicts an example architecture for implementing resource conservation mode and quota-based rules in a printing device, managed by network print services embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.
1.0 OVERVIEW
2.0 SYSTEM ARCHITECTURE
3.0. IMPLEMENTING A RESOURCE CONSERVATION MODE BY MODIFYING USER-PROVIDED OPTIONS AND FEATURES
4.0 IMPLEMENTING A RESOURCE CONSERVATION MODE BY PROVIDING DATA DEFINING THE RESOURCE CONSERVATION MODE
5.0 IMPLEMENTING PRINTING QUOTA RULES
6.0. IMPLEMENTATION MECHANISMS
1.0 Overview Implementations of a resource conservation mode on a printing device allow reducing the amount of consumable resources used for executing print jobs on printing devices. When a resource conservation mode is specified on a printing device, the printing is executed as being mindful of the environment and the resources that impact the environment. For example, instead of color printing, the printing device may be configured to produce only black-and-white printouts to avoid using more expensive color inks. As another example, instead of printing each document page on a separate sheet of paper, the printing device may be configured to print multiple pages of the document on one sheet of paper, i.e., "n-up printing," to reduce the amount of paper used to generate the printouts.

Implementations of printing quota rules on a printing device allow leveraging user billing procedures on printing resources used by the users. For example, the printing quota rules may allow limiting the amount of printouts that a user may sent to a particular printer within a particular period of time. According to another example, the printing quota rules allow limit the amount of printouts that a group of users may send to a group of printers within a particular period of time.

A resource conservation mode may be implemented on a printing device separately from the implementation of printing quota rules. Alternatively, the implementation of the resource conservation mode may be combined with the implementation of the printing quota rules.

In an embodiment, a printing device, on which a resource conservation mode and printing quota rules are implemented, comprises a print manager. The print manager may be configured to communicate with a network print service to implement the resource conservation mode and printing quota rules for each print job sent by each user to the printing device.

In an embodiment, a print manager is configured to retrieve a plurality of print options and features to be used to process a particular print job on a printing device. In response to determining that a resource conservation mode is specified for the printing device, the print manager may identify, from a plurality of print options, one or more particular print options that are associated with the resource conservation mode, and generate a modified plurality of print options and features by changing a feature for each of the one or more particular print options to implement the resource conservation mode.

In an alternative embodiment, a print manager provides, to a network print service, data indicating a plurality of print options and features. The data reflects the implementation of a resource conservation mode on a printing device and may be provided in advance of receiving a print job at the printing device. When the print manager determines that a user would like to submit a particular print job to the printing device, the network print service may use the data, implementing the resource conservation mode, to generate a user interface, from which the user may select the options and features for the particular print job. The options and features selected by the user comply with a resource conservation mode. For example, some options and features that would normally be made available to a user but that do not comply with the resource conservation mode may not be made available to the user. Examples include color printing, single sided printing, single page printing, i.e., "1-up," etc. The user-selected options and features are associated with the particular print job, and sent to the particular printing device.

In an embodiment, a print manager is also configured to apply one or more printing quota rules to a user account, and to determine whether a print quota associated with the user account has been reached. The implementation of the printing quota rules may be combined with the implementation of a resource conservation mode. For example, upon determining that a particular print job should be executed for a particular user on a particular printing device, and in response to determining that a print quota associated with the particular user's account has not been reached, the print manager may determine whether a resource conservation mode is specified for the particular printing device, and if so, execute the particular print job according to the resource conservation mode.

In an embodiment, in response to determining that a print quota associated with a user account has been reached, a print manager may cancel a particular print job received from the user, and send a cancellation notification to the user or another recipient, such as an administrator, indicating that the particular print job has been cancelled.

In an embodiment, a print quota may be associated with an account of an individual user, a group of members, for each of the printing devices managed by a network print service, or for a group of printing devices managed by the network print services. For example, a particular user may have a separate print quota for each of the printing devices to which the user is authorized to send print jobs.

In an embodiment, a print quota is reset to an initial value periodically. The print quota may be reset by a system process or a system administrator of a network print service. For example, upon determining that a user has exhausted the print quota associated with the user account, the system process may determine whether the print quota may be increased, and if so, increase the print quota by some quota amount for the user.

In an embodiment, a print manager is also configured to update a print quota upon receiving a processing notification that the particular print job was processed. For example, if a user submitted a particular print job to a network print service, the network print service may retrieve information about the user account, and allow execution of the particular print job if the user print quota has not been exceeded.

In an embodiment, a printing device also comprises one or more application modules that are configured to execute one or more applications. For example, one or more applications may be adapted to receive a particular print job from a web service by polling a network print service periodically to retrieve the particular print job, or by accepting the particular print job from the network print service when the service pushes the particular print job to the printing device. Further, one or more applications may be configured to send a job status update for the particular print job to the web service upon receiving a processing notification that the particular print job was processed.

In an embodiment, a printing device also comprises user interface modules configured to generate and display a graphical user interface for a user, and to collect user input entered into the graphical user interface.

In an embodiment, a printing device also comprises one or more print handler configured to accept, process and execute print jobs.

In an embodiment, a printing device communicates with a network print service directly via one or more direct communications links. Alternatively, the printing device may communicate with the network print service via a proxy, such as a computing device configured to process requests and responses exchanged between the printing device and the network print service.

2.0 System Architecture

FIG. 1 is a block diagram that depicts an example of the architecture for implementing resource conservation mode and quota-based rules in a printing device, managed by network print services, according to an embodiment.

Architecture 100 includes a printing device 102, a network print service 104, a system administrator station 106 and a client device 110. For illustration purposes only, FIG. 1 depicts that a system administrator manages the network print service 104 and/or the printing device 102 from the remote system administrator station 106; however, in practical embodiments, the system administrator can manage the network print service 104 locally, and can locally manage the printing device 102. Also, for illustration purposes only, FIG. 1 depicts one printing device 102, one network print service 104, one system administrator station 106, and one client device 110; however, the embodiments described below are not limited to just one printing device 102, one network print service 104, one system administrator station 106, and one client device 110. There may be any number of printing devices 102, network print services 104, system administrator stations 106, and client devices 110.

Referring again to FIG. 1, in an embodiment, a network print service 104 is a part of a network referred herein as a cloud. Alternatively, network print service 104 may be implemented on any type of network or standalone computer that is communicatively coupled with a printing device 102 and client device 110.

A "cloud" is a computing system communicatively coupled to one or more printing devices 102 and one or more client devices 110, and configured to provide processing resources, storage resources and other computing services, or any combination thereof, to printing devices 102 and client devices 110. The services may be made available using various methods, including, for example, providing the services via a web browser.

The communications links between the cloud and each of printing devices 102 and client devices 110 may be implemented by any medium or mechanism that provides for the exchange of data between the elements of FIG. 1. Examples of such links include, without limitation, a network such as a Local Area Network (LAN), Wide Area Network (WAN), Ethernet or the Internet, or one or more terrestrial, satellite or wireless links.

In an embodiment, a client device 110 is communicatively coupled with network print service 104 and other devices in architecture 100. In an embodiment, client device 110 communicates with network print service 104 by providing, to network print service 104, job settings data, including features and options to be used in processing a document by printing device 102. While the options indicate the categories of settings available on a printing device 102, the features indicate specific settings associated with the categories. Examples of the features and options supported by printing device 102 include, without limitation, printing features and options (duplex option, finisher features, the types of paper format that are available on printing device 102), the types of formatting that are available on printing device 102, color or black/white printing, collate or not-collate, document scanning features and options and other capabilities specific to the printing device 102.

Client device 110 may be implemented as any type of device equipped with wireless-communication capabilities, capabilities to generate, display and interact with a graphical user interface, capabilities to access the Internet, and other capabilities specific to the mobile device technology. Non-limiting examples of client device 110 include, without limitation, cellular telephony devices such as smart phones, cell phones, personal digital assistants (PDAs), and tablet devices.

Client device 110 may be configured to display, on a touch screen display, a series of graphical displays, each of which provides a user with choices, and each of which is configured to accept the user's selection and to communicate the user's selections to other applications residing on client device 110.

In an embodiment, client device 110 hosts one or more applications facilitating communications with network print service 104 and facilitating execution of various tasks. For example, client device 110 may host an interface application that allows a user to authenticate to client device 110, an application that allows scanning information from printing device 102, an application that allows communicating with network print service 104, and other applications that allow communicating with other devices in architecture 100. For example, client device 110 may host applications for creating and sending print jobs to network print service 104 or to printing device 102.

In an embodiment, a client device 110 executes an application that allows a user to interact with network print service 104 and printing device 102. For example, client device 110 may execute one or more application designed to create a print job to be printed on printing device 102, send the print job to network print service 104 (or, optionally, directly to printing device 102), receive notifications from network print service 104 (or from printing device 102), and monitor execution of print jobs submitted for execution.

In an embodiment, client device 110 executes a web browser application that allows client device 110 to interact with network print service 104. For example, client device 110 may launch a Goggle Chrome web browser and via the browser, client device 110 may request services from network print service 104.

In an embodiment, client device 110 executes a web browser application that causes generating a graphical user interface (GUI) to display the features and options of printing device 102. The web browser application may also be configured to receive a user's selection of the electronic document to be processed and a user's selection of the features and their corresponding options to be used in processing the electronic document on printing device 102.

In an embodiment, a web browser application of client device 110 may also be configured to cause sending job settings data and electronic document data to network print service 104. Upon receiving the data, network print service 104 may store the particular print job in storage 144 as one of the print jobs 146, 148. The particular print job may be queued in a queue (storage 144) as associated with printing device 102, and delivered to printing device 102 for execution at a later time.

In an embodiment, a web browser application of client device 110 may also be configured to display a graphical user interface, depicting the settings available on printing devices. The settings may reflect an implementation of a resource conservation mode. For example, if printing device 102 has been registered as operating in the resource conservation mode, then the graphical user interface displayed on client device 110 when a user of client device 110 wants to create print job for printing device 102 displays only those options and features that are available to a user in the resources conservation mode. Hence, if the resource conservation mode has been implemented on printing device 102, then a black-and-white printing may be available to the user, but a color-printing may be unavailable to the user. Similarly, if the resource conservation mode has been implemented on printing device 102, then only the recyclable paper may be available to the user, but the glossy paper may be unavailable to the user.

In an embodiment, an application of client device 110 receives a user's selections entered by the user using the GUI, and communicates the selections to network print service 104. The network print service 104 stores the selections, communicates them as job settings data to printing device 102, and communicates the results of the job processing to client device 110.

In an embodiment, a printing device 102 is a network device that is configured to communicate with a network print service 104 and process various document data. Printing device 102 may be a printer, a multi-functional peripheral (MFP), or any other device configured to print documents. Printing device 102 may be configured to perform printing, scanning, faxing and other types of document processing.

For example, printing device 102 may be configured to receive one or more print jobs from network print service 104, process the received print jobs, execute the printing of the received print jobs, and send notifications indicating status of each of the executed print jobs.

In an embodiment, printing device 102 is configured to download electronic document data from any type of data storage, process the downloaded data and provide network print service 104 with a status update regarding the processing.

In FIG. 1, printing device 102 includes a print manager 112, one or more application modules 114, one or more user interface modules 116, one or more print handlers 118 and storage 130. Although not depicted in FIG. 1, printing device 102 may also include an operation panel, which may be configured to display information to a user and to accept user input. In an embodiment, operation panel may include a screen having a touch-screen portion, on which a graphical user interface (GUI) may be displayed. The touch screen may allow a user to select icons and GUI objects on the GUI. The GUI may be updated to reflect changes in the functionalities offered by the printing device 102. The operation panel may also include control buttons and a numeric keypad for receiving user input.

In an embodiment, print manager 112 is configured to receive instructions to configure printing device 102 as operating in a resource conservation mode and/or as enforcing printing quota rules on printing device 102. For example, print manager 112 may be configured to receive instructions from a system administrator, operating from a system administrator station 106, to configure a resource conservation mode on printing device 102. This may be accomplished by enabling those options and features on printing device 102 that comply with the resource conservation mode. Such features may include allowing printing only black-and-white copies of the documents, and disallowing printing color copies of the documents. Other features compliant with the resource conservation mode may include, without limitation, printing the documents in an n-up mode (multiple-pages of the document on one paper sheet), or other options.

In an embodiment, print manager 112 is also configured to verify, upon receiving a particular print job to be executed on printing device 102, whether a resource conservation mode is enabled on printing device 102. If the resource conservation mode is enabled on printing device 102, then print manager 112 enforces the resource conservation mode with respect to the particular print job. For example, if the resource conservation mode is enabled on printing device 102, then print manager 112 may modify the particular printing options and features so that the resulting (modified) printing options and features comply with the resource conservation mode. The details of this approach are described in more detail with reference to FIG. 2

According to another example, if a resource conservation mode is enabled on printing device 102, then print manager 112 may enforce the resource conservation mode by providing network print service 104 with data that describe only those options and features of printing device 102 that comply with the resource conservation mode. The details of this approach are described in more detail hereinafter with reference to FIG. 3.

In an embodiment, print manager 112 is further configured to determine whether printing quota rules should be enforced with respect to the users who would like to print documents on printing device 102. For example, if a system administrator, operating from a system administrator station 106, has configured printing device 102 as implementing printing quota rules, then print manager 112 may check a print quota associated with a particular user when a print job is received from the particular user. If the print quota associated with the particular user is insufficient to execute the print job from the particular user, print manager 112 may generate and sent a notification indicating that the user print quota has been exceeded. The details of this approach are described in reference to FIG. 4.

In an embodiment, print manager 112 may also be configured to send print quota updates to network print service 104. For example, print manager 112 may send a print quota update after a particular print job was successfully completed for a particular user. Further, print manager 112 may send a print quota update to indicate that the particular user might want to request a print quota increase in the future. Other examples of notifications may also be generated and transmitted by print manager 112.

In an embodiment, an application module 114 of printing device 102 is configured to implement interfaces with network print service 104. FIG. 1 depicts one application module 114; however, practical embodiments may include a plurality of application modules 114.

An application module 114 may be configured to facilitate a registration of printing device 102, provide print jobs to printing device 102, and interface with network print service 104. For example, application module 114 may be designed to provide an interface for registering printing device 102 with network print service 104. Further, application module 114 may be configured to support communications with network print service 104, to receive instructions from a system administrator operating from a system administrator station 106, to facilitate communications with client device(s) 110, and to transmit notifications to network print service 104 and client device 110.

In an embodiment, a user interface module 116 of printing device 102 is configured to generate, display and manage a display of the user interface. User interface module may be configured to generate a graphical user interface, via which a user may specify options and features to be used by printing device 102 while processing a user-specified print job. User interface module 116 may also be configured to receive data about options and features available on printing device 102, to receive modified options and features that comply with a resource conservation mode, and to receive other types of data. Furthermore, user interface module 116 may be configured to send data about options and features available on printing device 102 and to send other types of data.

In an embodiment, a print handler 118 of printing device 102 is configured to cause printing of one or more documents on printing device 102. Print handler 118 may be initiated, for example, in response to receiving a particular print job from network print service 104. Alternatively, print handler 118 may be initiated in response to determining that a particular print job for printing device 102 is stored in storage 144 of network print service 104.

In an embodiment, to enable printing a particular print job on printing device 102, print handler 118 retrieves information specific to the print job. Such information may include print setting selection data and electronic document identification data. The print setting selection data indicates the features and options that printing device 102 should apply while performing the print job. The electronic document identification data comprises information identifying an electronic document to be printed by printing device 102. For example, the electronic document identification data may comprise the electronic document name, a web link to the electronic document data, a pointer to the electronic document data, or any other information that allows printing device 102 to retrieve and download the electronic document data.

In an embodiment, storage 130 of printing device 102 may be implemented as any type of data storage, including data servers, computer disks, database servers, and other data storage devices. Storage 130 may be configured to receive print jobs from a client device 110 and a network print service 104. Storage 130 may also be configured to store the received print jobs in storage 144, and manage data stored in the storage 144.

As depicted in FIG. 1, storage 144 may be configured to store a plurality of print jobs 146, 148. Although FIG. 1 depicts two print jobs (146, 148) stored in storage 144, more than just two print jobs may be stored in storage 144.

In an embodiment, a network print service 104 of printing device 102 is configured to manage Internet-based printing. Internet-based printing allows a user, communicating with network print service 104 from a client device 110, to create a particular print job to be executed on printing device 102, and store the particular print job in storage associated with network print service 104. Once the print job is stored in a job queue dedicated to the job for printing device 102, network print service 104 manages the execution of the print job.

In an embodiment, network print service 104 manages enforcing a resource conservation mode on printing device 102. For example, network print service 104 may be configured to allow a user of client device 110 to create a particular print job to be executed on printing device 102, store the particular print job, determine whether a resource conservation mode should be enforced on printing device 102, and if so, instructing printing device 102 to execute the particular print job in compliance with the resource conservation mode.

In an embodiment, network print service 104 manages enforcing printing quota rules for printing on printing device 102. For example, network print service 104 may be configured to allow a user of client device 110 to create a particular print job to be executed on printing device 102, store the particular print job in a job queue dedicated to jobs for printing device 102, receive information indicating that a print quota associated with the user has been already exceeded, and if so, notify the user that the particular print job cannot be executed by printing device 102 due to the quota problem.

In an embodiment, network print service 104 manages registration of user accounts and printing modes. For example, network print service 104 may be configured to facilitate communications between a system administrator, working at a system administrator station 106, and printing device 102 to register printing device 102 with network print service 104. Network print service 104 may communicate printer registration commands to printing device 102 to enable a resource conservation mode on printing device 102, or to delete the settings for the resource conservation mode on printing device 102. Further, network print service 104 may communicate a registration of a user account, establishing a print quota for the user account, update or modify the print quota for the user account, and perform any modification to the user account.

In an embodiment, network print service 104 is configured to manage print quotas for users, group or users and for printing devices managed by network print service 104. For example, network print service 104 may provide applications, such as web browsers, designed to create, modify and update user accounts, establish print quotas for individual users or groups of users, and establish print quotas for individual users and for each device managed by network print service 102. Network print service 104 may also be configured to reset the print quotas for the users and for the devices.

In an embodiment, network print service 104 manages one or more printing device 102 by sending one or more print jobs to the printing devices, managing the implementation of a resource conservation mode on the printing devices, managing the implementation of printing quota rules on the printing devices, and by enforcing various modes and rules.

3.0. Implementing Resource Conservation Mode by Modifying User-Provided Options and Features Implementations of a resource conservation mode are designed to reduce the amount of consumable resources used to print documents on a printing device. For example, when a resource conservation mode is specified for a printing device, executing a print job sent to the printing device may result in generating a black-and-white copy of the electronic document, regardless of whether the print job specified black-and-white printing or color printing. According to another example, when a resource conservation mode is specified for a printing device, executing a print job on the printing device may result in generating an output on a recyclable paper, regardless of whether the print job specified the recyclable paper or not.

A resource conservation mode is also referred to as a green printing mode. To enable a green printing mode on a printing device, a system administrator or other authority may specify the method in which green printing is implemented on the printing device. For example, to enable green printing on a printing device, a system administrator can configure the printing device to print documents using a duplex option, an n-up option, a low print density option, a low toner usage, or any other option that may contribute to conservation of printing resources. The printing device configured to process print jobs using one or more of the above options may be registered with a network print service as the device that implements a resource conservation mode.

Implementations of a resource conservation mode on a printing device may vary. This section describes the approach in which a print manager may modify a set of particular options and features associated with a print job submitted by a user. (An alternative approach is described in the following section, and describes that a user is presented with a GUI that indicates to a user only those options and features that comply with the resource conservation mode.)

Figure 2:
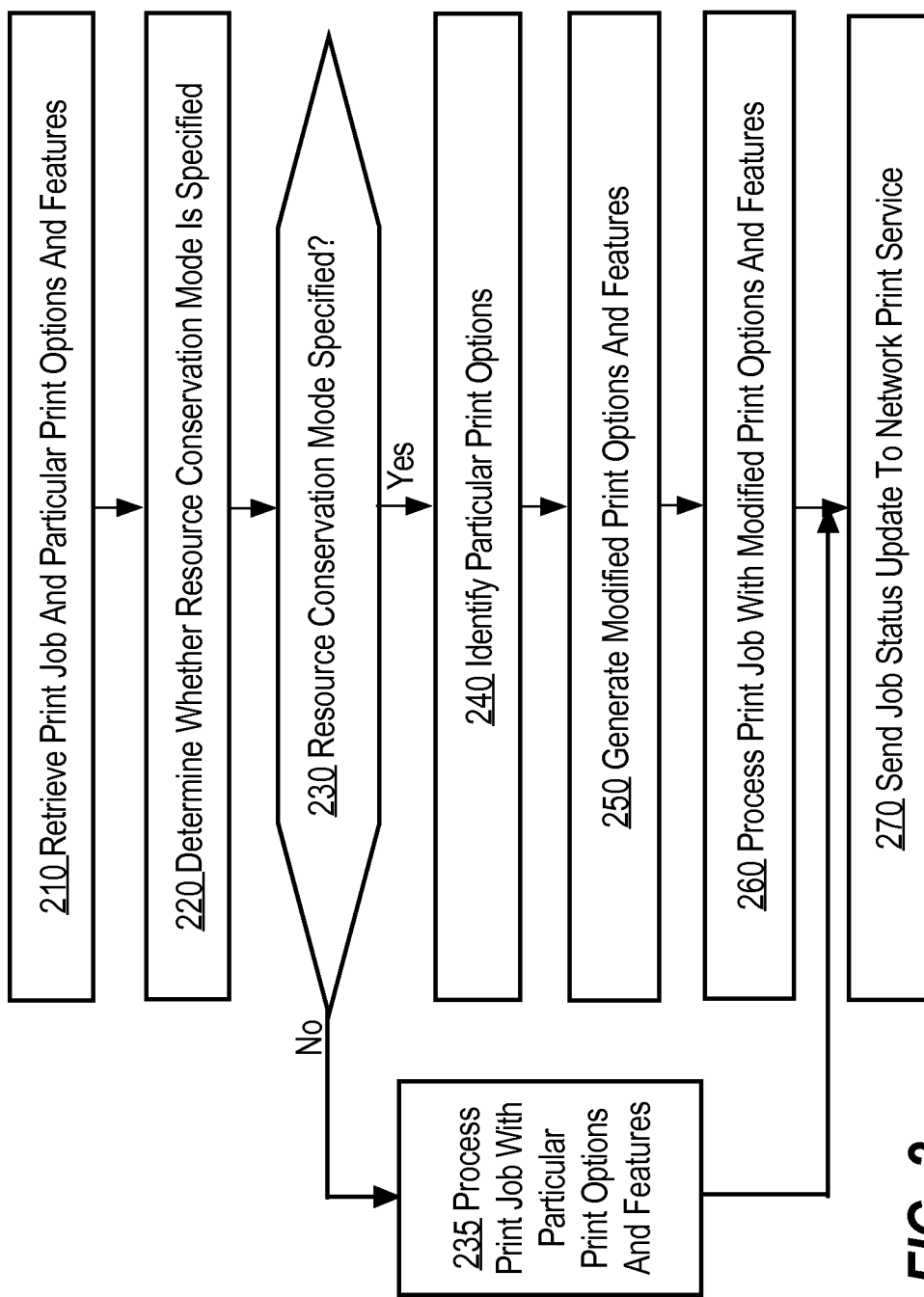
FIG. 2 is a flow diagram depicting an approach for implementing a resource conservation mode in a printing device, managed by network print services embodiment.

FIG. 2 is a flow diagram depicting an approach for implementing a resource conservation mode in a printing device, managed by network print services embodiment. According to the approach depicted in FIG. 2, a print manager of the printing device is a primary module that executes the implementation of the resource conservation mode on the printing device.

In an embodiment depicted in FIG. 2, it is assumed that a resource conservation mode has been already enabled on a printing device. The resource conservation mode may be enabled on the printing device remotely or locally. For example, the resource conservation mode may be enabled by a system administrator who accesses the configuration settings for the printing device and configures the printing device as capable of printing black-and-white copies (but not color copies), printing using an n-up option (but not printing just a document page on a separate sheet of paper), or any other type of printing that implements the resource conservation mode. The configuration settings may be stored directly on the printing device, or in storage associated with a network print service.

According to another example, a resource conservation mode may be enabled when a system administrator or an authorized user enters one or more green printing options directly from a graphical user interface displayed on a printing device. Using a display of the graphical user interface, a system administrator can configure the printing device as capable of printing black-and-white copies (but not color copies), printing using an n-up option, or any other type of printing that implements the resource conservation mode.

Once a resource conservation mode is enabled on a printing device, a print job sent to the printing device will be executed to conserve the resources that are necessary for producing a printout. For example, if a particular implementation of the resource conservation mode on a printing device specifies that black-and-white copies be produced instead of color copies, then, even if a user requests printing color copies of a document, the black-and-white copies will be produced instead.

At block 210, a print job to be performed by the printing device is retrieved, along with a plurality of particular options and settings, associated with the print job. The print job and the particular options and settings may be retrieved from a network print service that implements Internet-based printing. Alternatively, the particular options and settings may be retrieved from the print job itself or from another location.

As described above, with Internet-based printing, a user can create a print job by accessing a web browser application hosted by a network print service and have the print job executed on any of the printing devices managed by the network print service. To create a print job, the user can indicate a location of the electronic document that the user wants to print and a particular set of options and features that should be used in executing the print job. That information may be stored in storage associated with the network print service, and subsequently provided to the printing device.

Providing a print job to a printing device managed by a network print service may be accomplished in a variety of ways. For example, a network print service may maintain one or more job queues for each printing device that the network print service manages, and after a particular print job is appended to a respective queue, the network print service may send a notification to the printing device that the particular print job has been queued for the printing device. Subsequently, one of the software applications, executed on the printing device, may cause accessing the network print service, requesting the particular print job from the network print service and downloading the print job to the printing device.

Alternatively, a network print service may execute a software application to cause establishing of a communications link with the printing device and cause downloading the particular print job from the storage of the network print service to the printing device. Other methods for retrieving print jobs to the printing device may also be implemented.

At block 220, a determination is made whether a resource conservation mode is specified for the printing device. For example, the print manager of a printing device may determine whether a resource conservation mode is specified for the printing device. The resource conservation mode is specified for the printing device if the resource conservation mode has been enabled on the printing device. Various methods for enabling the resource conservation mode have been described above.

Determining whether a resource conservation mode is specified for a printing device may be performed in many ways. For example, a print manager may access a configuration file of the printing device and check whether the resource conservation mode settings have been saved in the configuration file. According to another approach, the print manager may access a repository of configuration files stored in association with a network print service and check whether the respective configuration file contains the settings indicating the resource conservation mode for the printing device. Other methods for determining whether a resource conservation mode is specified on the printing device may also be implemented.

At block 230, if the resource conservation mode is specified for the printing device, then the print manager proceeds to execute the step indicated by block 240. However, if the resource conservation mode is not specified for the printing device, then the print manager proceeds to execute the step indicated by block 235.

At block 240, one or more particular print options, from a plurality of print options, that are associated with a print job and that are also specific to the implementation of a resource conservation mode implemented on a printing device are identified. For example, if a particular implementation of the resource conservation mode on the printing device specifies that only black-and-white copies of a document be produced by the printing device, then the print manager may identify one or more particular print options that are associated with the retrieved print job and that indicate whether a user requested a color printing or a black-and-white printing. If the user requested a color printing, then the print manager may modify the one or more particular print options to enforce the black-and-white printing and to prevent the color printing. However, if the user requested a black-and-white printing, then the print manager does not modify the respective particular options.

At block 250, a modified plurality of print options and features is generated. The modified plurality of print options and features may be generated by changing the feature for each of the particular print options that need to be changed to implement a resource conservation mode. For example, the print manager may determine that the implementation of the resource conservation mode on the printing device specifies that only black-and-white printouts may be produced by the printing device, and no color printouts may be generated by the printing device. In this example, the print manager may generate a modified plurality of print options and features from the particular options and features that were associated with the retrieved print job. If the particular features associated with the retrieved print job indicated that the requested printout should be a color printout, then the print manager may modify the particular features associated with the retrieved print job by overwriting the color-printout settings to the black-and-white settings. Subsequently, even though a user requested a color output, the print manager overwrites the settings to cause the printing device to generate a black-and-white output, and thus to conserve the printing resources used by the printing device.

At block 260, the print job is processed using a modified plurality of print options and features to enforce a resource conservation mode while executing the print job. To enforce the resource conservation mode on the printing device, the modified plurality of print options and features is used to process the print job, instead of the particular plurality of print options and features previously associated with the print job. For example, if a user requested that a printing device generates a color printout of a particular electronic document, but the printing device is configured to operate in a resource conservation mode, then the print manager of the printing device may instruct the print handler to generate the black-and-white printout, instead of the color printout.

However, if a print manager determined that a resource conservation mode is not specified on a printing device, then at block 235, the print job is processed using the original particular options and features that are specified for the print job. Hence, this step is performed when the printing device does not operate in a green printing mode, and it follows the sequence of steps typical for conventional Internet-based printing.

Once execution of the print job is completed, either by enforcing a resource conservation mode or not, then at block 270, a job status update is sent to a network print service. For example, a print manger may invoke one of the applications, residing on the printing device, to generate and send a job status update to a network print service. The job status update may provide to the network print service a variety of information related to the status of the print job, the status of an account associated with the user who sent the print job, and any other types of information useful to the network print service. For example, the job status update may provide the information indicating that the print job was executed in a resource conservation mode, and thus that, instead of printing color outputs, black-and-white copies were generated.

According to another example, a job status update may provide information indicating that, for some reason, a print job was not successfully completed, and providing the reasons for the execution failure. Example reasons include, without limitation, a lack of the black-and-white ink in the printing device, an insufficient user quota associated with the user to complete the print job, or any other applicable reason.

According to other example, a job status update may provide information indicating that, executing a print job on a printing device consumed a certain amount of the resources, and thus the cost of such resources should be subtracted from the user account associated with the user who sent the print job.

Upon receiving a job status update, a network print service may generate a notification to be sent to a user who submitted the particular print job. Also, the network print service may update a user account associated with the user, send a notification to a system administrator to service the printing device, or perform any other action related to the job status update.

4.0 Implementing a Resource Conservation Mode by Providing Data Defining the Resource Conservation Mode The approach described in this section differs from the approach described in the previous section in the sense that the approach described in this section does not require modifying options and features associated with a print job. In this approach, a user is presented with a GUI that indicates to a user the options and features that comply with the resource conservation mode, and thus the user selects the options and features that comply with the resource conservation mode, and associates those options and features with a print job.

In this approach, enforcement of a resource conservation mode on a printing device appears to be transparent to a printing device. Once a resource conservation mode is enabled on the printing device, the features that do not comply with the resource conservation mode, but that otherwise would have been available on the printing device, become unavailable to the users. For example, once the resource conservation mode is enabled on the printing device and color printing on the printing device is disabled, the color printing option is not even presented to the user as available on the printing device. Hence, while creating a print job for the printing device, the user cannot select color printing from a GUI generated for the user. Subsequently, while associating particular options and features with a print job to be executed on the printing device, the user can select a black-and-white printing, but not a color printing.

Figure 3:
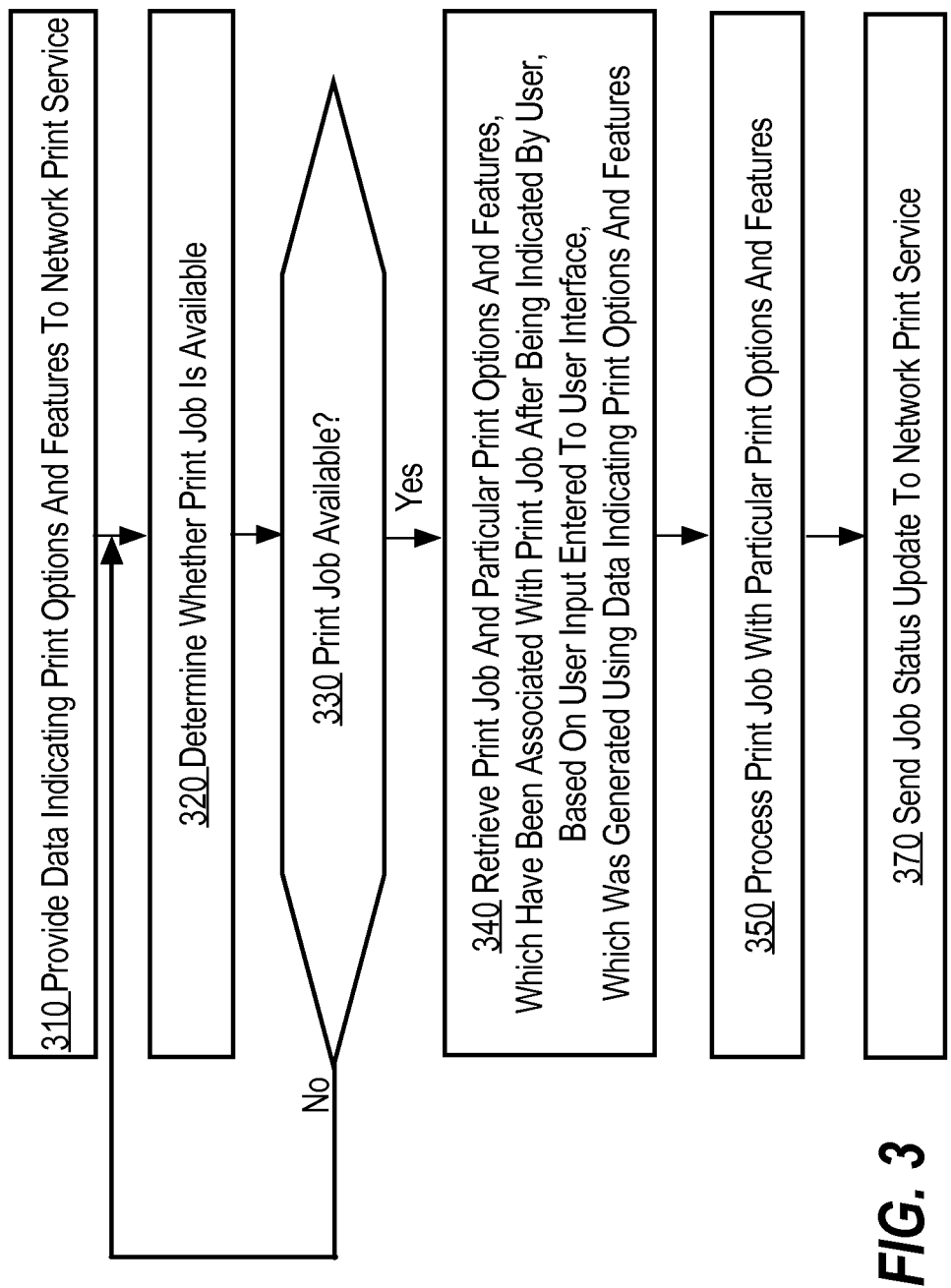
FIG. 3 is a flow diagram depicting an approach for implementing a resource conservation mode in a printing device, managed by network print services embodiment.

FIG. 3 is a flow diagram depicting an approach for implementing a resource conservation mode in a printing device, managed by network print services, according to an embodiment. Generally, according to the approach depicted in FIG. 3, a resource conservation mode is implemented without generating modified print options and features. In this approach, before a print job is created for a particular device, a print manager of the particular device provides, to a network print service, data indicating print options and features that comply with a resource conservation mode. The network print service uses the received data to generate a user interface for a user. The user selects particular print options and features, and associates the selected particular print options and features with a particular print job. The particular print options and features comply with the resource conservation mode, and are used to execute the particular print job on the printing device.

Referring again to FIG. 3, it is assumed that a resource conservation mode has been already enabled on a printing device. Hence, before a particular print job is sent to the printing device, the resource conservation made has been already enabled on the printing device.

A resource conservation mode may be enabled on a printing device remotely or locally. Various methods for enabling a resource conservation mode on a printing device were described above.

Once a resource conservation mode is enabled on a printing device, at block 310, data indicating printing options and features that are available on the printing device is provided to a network print service. For example, if the printing device implements the resource conservation mode by prohibiting color printing but by allowing black-and-white printing, then the data that indicates the printing options and features will comprise information indicating that the black-and-white printing is available, but the color printing is unavailable. Hence, even if the color printing would have been available had the printing device were not operating in the resource conservation mode, a user cannot select the color printing once the resource conservation mode is enabled.

At block 320, a determination is made whether any print job is available for the printing device. Various methods for determining whether a print job is available for the printing device were described above. For example, a print manager may invoke one of the applications, residing on the printing device, and cause establishing a communications link with a network print service and determine whether any print job has been queued in storage of the network print service for the printing device.

At block 330, if at least one print job is available, then processing proceeds to the step described in block 340; otherwise, processing proceeds to the step described in block 320 above.

At block 340, a print job and particular print options and features associated with the print job are retrieved from a network print service. Various methods for retrieving the print job were described above. For example, a print manager may invoke one of the applications residing on the printing device to establish a communications link with the network print service and download the print job from storage associated with the network print service.

In the approach depicted in FIG. 3, the retrieved particular print options and features already comply with the implementation of a resource conservation mode on a printing device. In this approach, a network print service ensures that the particular print options and features that a print manager retrieved from a network print service comply with a resource conservation mode enabled on a printing device.

This may be accomplished in a variety of ways. For example, using the data indicating print options and features available on a printing device that implements the resource conservation mode, a network print service may generate a graphical user interface. The graphical user interface may allow a user to select a set of particular options and features from those print options and features that comply with the resource conservation mode. Hence, in this approach, the user uses a GUI that does not contain any options or features that do not comply with the resource conservation mode.

Furthermore, in this approach, there is no need to overwrite or modify the user-provided options and features to conform them to the resource conservation mode because the user-provided options and features, associated with the retrieved print job, already comply with the resource conservation mode.

At block 350, the print job is processed using a set of particular print options and features to enforce a resource conservation mode. As described above, the set of the particular options and features already complies with the resource conservation mode; thus, the print handler executes the print job as any other Internet-based print job. For example, if the implementation of a resource conservation mode on the printing device caused disabling color printing on the printing device, then, while creating a print job for the printing device, a user could not select the color printing. Hence, the particular options and features that were provided (selected) by the user comply with the implementation of the resource conservation mode, and hence, the print handler executes the print job as any other Internet-based print job.

Once execution of the print job is completed, in the step at block 370, a job status update is sent to a network print service. The step at block 370 is similar to the step at block 270, which was described in detail above.

5.0 Implementing Printing Quota Rules

Implementations of printing quota rules are designed to enhance billing procedures applicable to user accounts to reflect a user usage of printers managed by a network print service. For example, by implementing the printing quota rules, the system may accurately monitor the user usage of the printing resources, and reflect the user usage of the printing resources in the user billing and accounting. Further, the printing quota rules may allow limit the amount of printouts that a user can sent to a particular printer within a particular period of time.

In an embodiment, printing quota rules apply to user accounts created for the users who request document printing on globally managed printing devices. The user accounts may be created using various methods and by various entities. For example, a user account may be created for a user by a system administrator when the user is registered with a network print service. Registration of the user with the network print service may include providing the user identification information, such a user name and a user password, providing an identification of each printing device to which the user can send a print job, and specifying a print quota value for the user.

The print quota value may be specified for each individual printing device to which the user can send a print job, or may be specified as a total value for all printing devices to which the user can send print job.

According to another example, as a user is being registered with a network print service, the user can be asked to provide an estimated print quota that the user would like to have available for printing on the printing devices managed by the network print service. Alternatively, a print quota may be established for users by an administrator.

According to other example, a print quota may be established for a group of users. For example, upon registration of a group of users, a print quota for the whole group may be established. When any of the users from the group attempts to print a document on printing device managed by a network print services, the print quota is checked and verified to ensure that the printing may be allowed.

Furthermore, a print quota may be established for a group of users and for each of the printing device to which the group of users can have access. For example, upon registration of a group of users, a print quota for the whole group but for each individual printing device may be established. When a user from the group attempts to print a document on a particular printing device, the quota associated with the group and with the particular printing device is checked to determine whether the user can indeed print on the particular printing device.

A print quota may be reset periodically. For example, upon determining that the print quota for a particular user has been depleted, the user, or a system administrator, can request that the print quota for the particular user be reset or increased.

According to another example, a print quota may be automatically increased if a network print service determines that the print quota fell below a threshold value. The threshold value may be established by a system administrator, or by a network print services, and may depend on the type of subscription or the type of registration made for the user.

According to other example, a print quota for a particular user can be increased when the user submits a payment to a network print service. For example, if a user is billed for the services provided to the user by the network print service, then the print quota may depend on the payment submitted by the user to the network print service, and may be proportional to the payment amount submitted by the user.

Information about a print quota may be made available for billing purposes managed by a network print service. For example, a higher fee may be required for one user who requested a higher print quota than the fee for another user who was assigned a small value of the print quota. Furthermore, a fee may be assessed to the user account when the user requests an increase of the print quota or if the user exceeds the print quota. Other methods for billing the users based on the usage of the print quotas are also contemplated.

Figure 4:
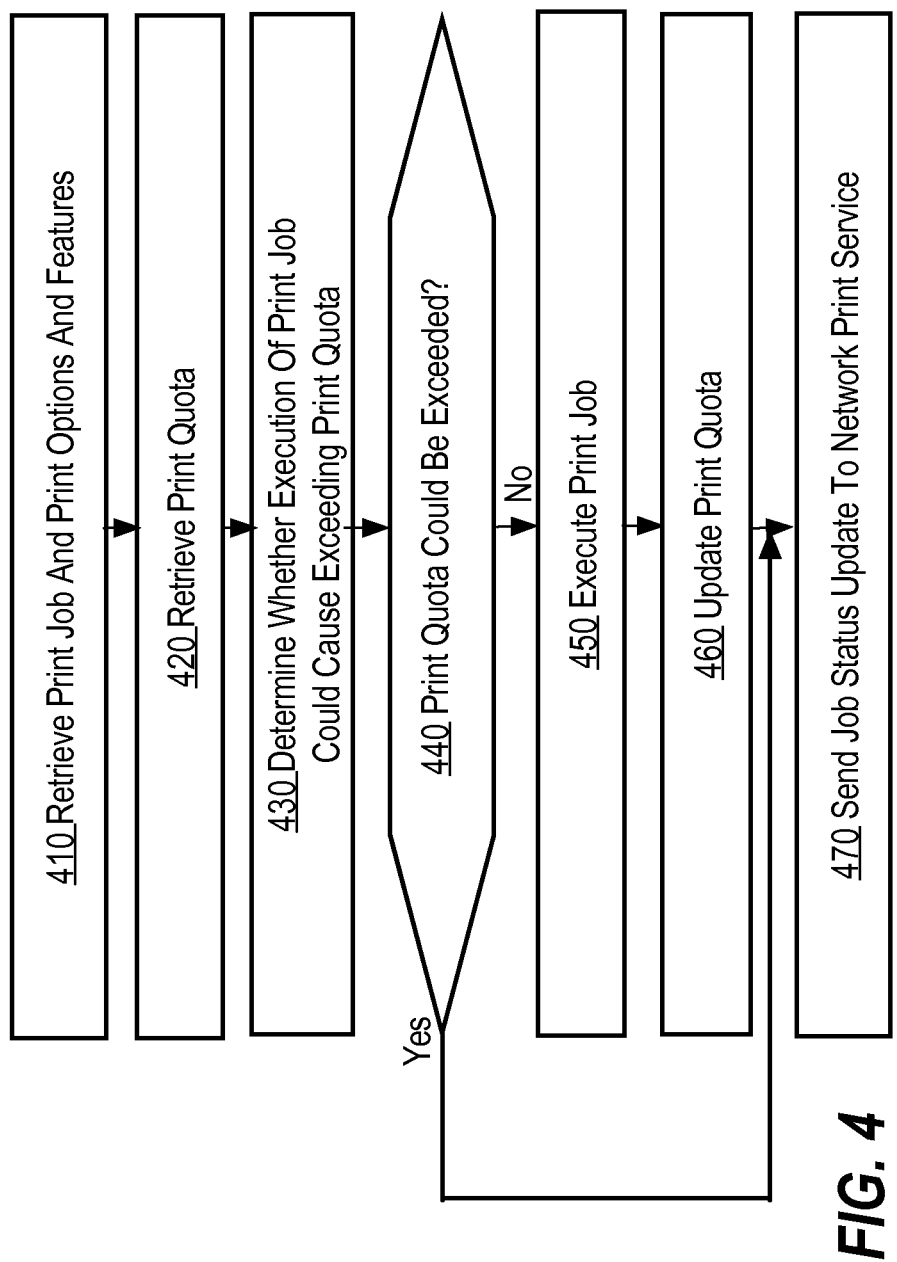
FIG. 4 is a flow diagram depicting an approach for implementing printing quota rules in a printing device, managed by network print services embodiment.

FIG. 4 is a flow diagram depicting an approach for implementing printing quota rules in a printing device, managed by network print services, according to an embodiment. In the approach depicted in FIG. 4, one or more printing quota rules are applied to a user account, associated with a user who sent a particular print job to a printing device, to determine whether a print quota associated with the user account has not been reached. In response to determining that the print quota associated with the user account has not been reached, the particular print job is processed.

Printing quota rules may be implemented on a printing device separately from the implementations of a resource conservation mode on the printing device. Alternatively, the printing quota rules may be implemented in combination with the implementation of the resource conservation mode. For example, upon determining that a print job was submitted for printing on a particular printing device by a particular user, a determination may be made whether the printing quota rules apply to an account of the particular user, and if so, apply the printing quota rules to the user account to determine whether the print job may be executed.

At block 410, a print job and print options and features associated with the print job are retrieved. Various methods for retrieving a print job were described above. For example, the print job may be retrieved as it was described at block 210 of FIG. 2. Since the implementation of a resource conservation mode may be combined with the implementation of the print quota, a print manager may retrieve the print job and the print options and features once, and then perform a combined implementation of the print quota and the implementation of a resource conservation mode.

At block 420, a print quota associated with a user account of the user who submitted a print job for printing on a printing device is retrieved. Information about the print quota may be retrieved from any storage available to the print manager and/or managed by a network print service. For example, the information about the print quota may be retrieved from a storage maintained by the network print service. Various methods of establishing and modifying the print quota were described above.

At block 430, a determination is made whether execution of a retrieved print job could cause exceeding the print quota. The determination may be performed in various ways. For example, the print manger may invoke an application residing on the printing device and cause the application to perform an analysis of the retrieved print job to determine the count of the pages to be printed. If the count of pages exceeds the print quota associated with the user account, then the print manager may determine that the execution of the retrieved print job would exhaust the print quota and that the user does not have a sufficient quota to request the execution of the print job. However, if the count of pages does not exceed the print quota associated with the user, then the print manager may allow the execution of the retrieved print job.

At block 440, a determination is made whether a print quota, associated with a user account, could be exceeded if a retrieved print job were executed for the user. If the determination is positive, then processing proceeds to performing the step at block 450; otherwise, processing proceeds to performing the step at block 470.

At block 450, the retrieved print job is executed. Execution of the retrieved print job may be dependent on the implementation of a resource conservation mode, described above. For example, if a resource conservation mode is implemented on the printing device, then a print manager may proceed to performing the steps described in FIG. 2 or FIG. 3. In this example, the implementation of the printing quota rules is combined with the implementation of the resource conservation mode, provided that the printing quota rules are first applied to a user account, and if the user has sufficient quota to request execution of the particular print job, then the execution of the particular print job conforms to the resource conservation mode.

At block 460, a print quota for a user for whom a particular print job was executed is updated. For example, if the user requested printing a five-page long document, and the particular print job was successfully executed, then one of the applications residing on the printing device may be invoked to cause the application to send information to a network print service to indicate that the user's print quota should be reduced by the value of five (corresponding to the five pages printed for the user).

Furthermore, additional information may be sent to a network print service to indicate any error message or any problem that occurred during the execution of the print job. For example, if the print quota for a user was sufficient to print the requested document, but the printing of the requested document failed, then the print manager may send an error message to the network print service to request that the user print quota be unchanged since the requested printout was not produced.

At block 470, a job status update is sent to a network print service. The step at block 470 is similar to the step at block 270, which was described in detail above.

The usage of the printing devices managed by a network print service may be monitored and summarized based on a variety of factors. For example, the information reflecting the user usage of the print quota with respect to each of the printing devices managed by the network print services may be provided to the network print service. The information reflecting how often print jobs for each of the users were not completed due to the fact that the user's print quota was depleted may also be provided to the network print service. Furthermore, a recommendation may be provided to the network print service to periodically increase the print quotas for some or all users. Other types of information or statistical data may also be provided to the network print service.

6.0 Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
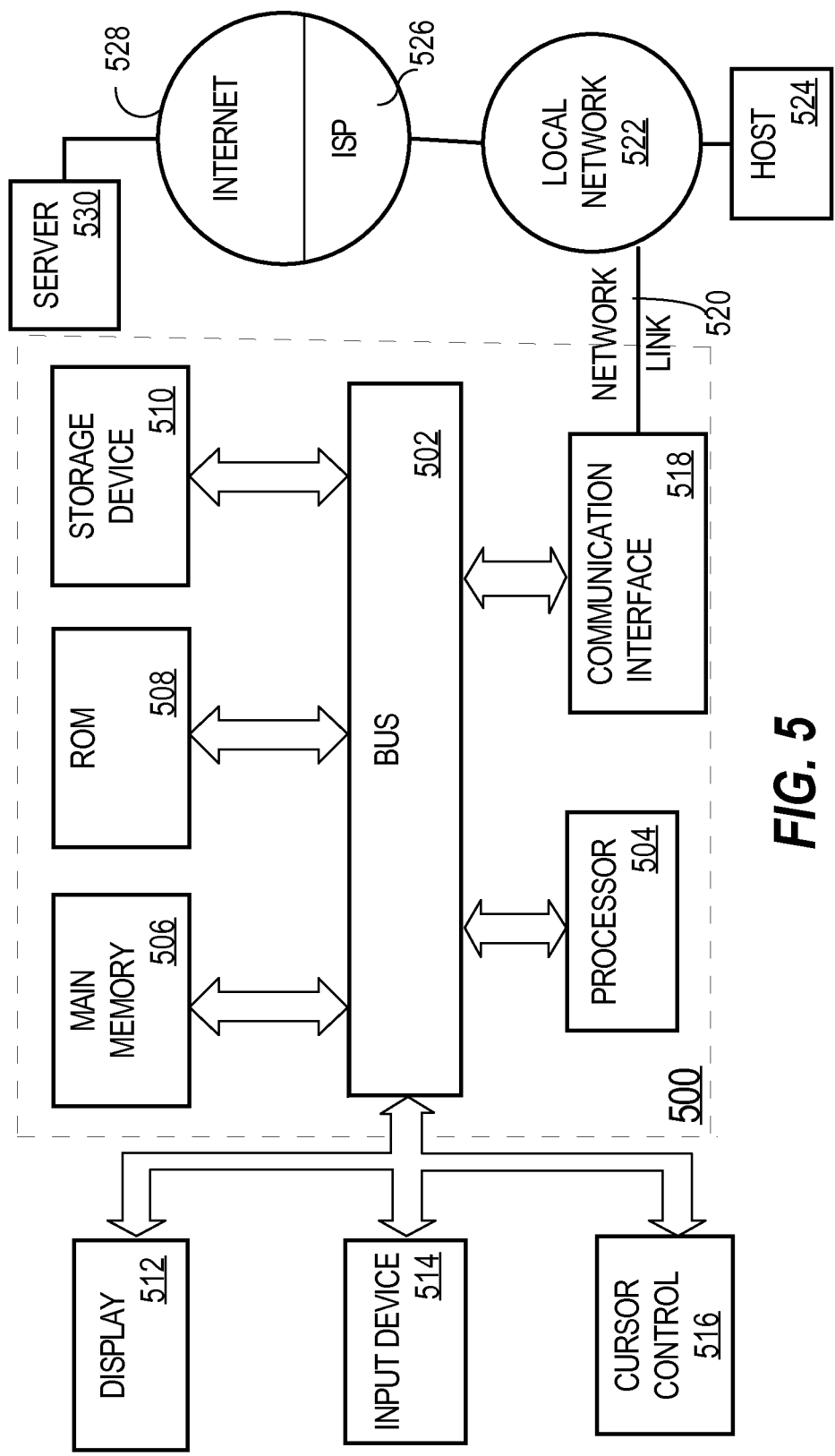
FIG. 5 is a block diagram that depicts a computer system upon which an embodiment may be implemented.

For example, FIG. 5 is a block diagram that depicts a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A printing device comprising:
   a print manager configured to:
      receive instructions from a system administrator whether to implement a resource conservation mode on the printing device;
      implement the resource conservation mode on the printing device in response to determining that the instructions request the resource conservation mode on the printing device;
      receive, from a user, a particular print job that specifies a plurality of print options and features to process the particular print job on the printing device;
      determine, without receiving any input from the user, whether the resource conservation mode is specified for reducing an amount of consumable printing resources used for printing on the printing device;
      in response to determining that the resource conservation mode is specified for the printing device:
         identify, from the plurality of print options and features, one or more particular print options that are associated with the resource conservation mode, and
         generate, without receiving any input from the user, a modified plurality of print options and features by changing one or more features of the one or more particular print options to implement the resource conservation mode, wherein implementing the resource conservation mode reduces the amount of the consumable printing resources used to print the particular print job;
      wherein, when the resource conservation mode is specified, the modified plurality of print options and features is used to process the particular print job instead of the plurality of print options and features.

2. The printing device of claim 1, wherein the one or more particular print options include one or more of: a duplex option, an n-up option, a print density option, a black-and-white option, a recyclable paper option, and a toner usage.

3. A printing device comprising:
   a print manager configured to:
   determine a plurality of print options and features specified to process a particular print job on the printing device;
   apply one or more printing quota rules to a user account associated with the particular print job to determine whether a print quota associated with the user account has not been reached;
   in response to determining that the print quota associated with the user account has not been reached:
      determine whether a resource conservation mode is specified for reducing an amount of consumable printing resources used for printing on the printing device;
      in response to determining that the resource conservation mode is specified for the printing device:

identify, from the plurality of print options and features, one or more particular print options that are associated with the resource conservation mode, and generate a modified plurality of print options and features by changing one or more features of the one or more particular print options to implement the resource conservation mode, wherein implementing the resource conservation mode reduces the amount of the consumable printing resources used to print the particular print job;

process the particular print job using the modified plurality of print options and features instead of the plurality of print options and features;

in response to determining that the print quota associated with the user account has been reached, cancel the particular print job and send a cancellation notification that the particular print job has been cancelled.

4. The printing device of claim 3,
wherein the print quota is also associated the printing device;
wherein the print quota is reset periodically.

5. The printing device of claim 3, wherein the print manager is further configured to:
update the print quota upon receiving a processing notification that the particular print job was processed.

6. The printing device of claim 1, further comprising one or more applications configured to:
receive the particular print job from a web service by polling the web service periodically to retrieve the particular print job, or by accepting the particular print job from the web service when the web service pushes the particular print job to the printing device;
send a job status update for the particular print job to the web service upon receiving a processing notification that the particular print job was processed.

7. The printing device of claim 6, wherein the printing device communicates with the web service directly or via a proxy.

8. A non-transitory computer readable storage medium, storing one or more sequences of instructions which, when executed by one or more processors, cause the one or more processors to perform:
receiving instructions from a system administrator whether to implement a resource conservation mode on a printing device;
implementing the resource conservation mode on the printing device in response to determining that the instructions request the resource conservation mode on the printing device;
receiving, from a user, a particular print job that specifies a plurality of print options and features to process the particular print job on the printing device;
determining, without receiving any input from the user, whether the resource conservation mode is specified for reducing an amount of consumable printing resources used for printing on the printing device;
in response to determining that the resource conservation mode is specified for the printing device:
identifying, from the plurality of print options and features, one or more particular print options that are associated with the resource conservation mode, and
generating, without receiving input from the user, a modified plurality of print options and features by changing one or more features of the one or more particular print options to implement the resource conservation mode, wherein implementing the resource conservation mode reduces the amount of the consumable printing resources used to print the particular print job;
wherein, when the resource conservation mode is specified, the modified plurality of print options and features is used to process the particular print job instead of the plurality of print options and features.

9. The non-transitory computer readable storage medium of claim 8, wherein the one or more particular print options include one or more of: a duplex option, an n-up option, a print density option, a black-and-white option, a recyclable paper option, and a toner usage.

10. A non-transitory computer readable storage medium comprising instructions which, when executed, cause one or more processors to perform:
determining a plurality of print options and features specified to process a particular print job on a printing device;
applying one or more printing quota rules to a user account associated with the particular print job to determine whether a print quota associated with the user account has not been reached;
in response to determining that the print quota associated with the user account has not been reached:
determining whether a resource conservation mode is specified for reducing an amount of consumable printing resources used for printing on the printing device;
in response to determining that the resource conservation mode is specified for the printing device:
identifying, from the plurality of print options and features, one or more particular print options that are associated with the resource conservation mode, and
generating a modified plurality of print options and features by changing one or more features of the one or more particular print options to implement the resource conservation mode, wherein implementing the resource conservation mode reduces the amount of the consumable printing resources used to print the particular print job;
processing the particular print job using the modified plurality of print options and features instead of the plurality of print options and features;
in response to determining that the print quota associated with the user account has been reached, canceling the particular print job and sending a cancellation notification that the particular print job has been cancelled.

11. The non-transitory computer readable storage medium of claim 10,
wherein the print quota is also associated the printing device;
wherein the print quota is reset periodically.

12. The non-transitory computer readable storage medium of claim 11, further comprising instructions which, when executed, cause the one or more processors to perform:
updating the print quota upon receiving a processing notification that the particular print job was processed.

13. The non-transitory computer readable storage medium of claim 8, further comprising instructions which, when executed, cause the one or more processors to perform:
receiving the particular print job from a web service by polling the web service periodically to retrieve the particular print job, or by accepting the particular print job from the web service when the web service pushes the particular print job to the printing device;

sending a job status update for the particular print job to the web service upon receiving a processing notification that the particular print job was processed.

14. The non-transitory computer readable storage medium of claim 13, wherein the printing device communicates with the web service directly or via a proxy.

15. A printing device comprising:
a print manager configured to:
receive instructions from a system administrator whether to implement a resource conservation mode on the printing device;
implement the resource conservation mode on the printing device in response to determining that the instructions request the resource conservation mode on the printing device;
receive, from a user, a particular print job that specifies a plurality of print options and features;
without receiving any input from the user, provide, to a network print service, data indicating the plurality of print options and features, wherein the data reflects implementation of the resource conservation mode on the printing device, wherein implementing the resource conservation mode reduces an amount of consumable printing resources used to process print jobs on the printing device;
determine whether the particular print job is available for printing on the printing device;
in response to determining that the particular print job is available for printing,
determine, from the network printing service, a particular plurality of print options and features specified to process the particular print job on the printing device;
wherein the particular plurality of print options and features is obtained by the network printing service by performing:
without receiving any input from the user, generating, using the data indicating the plurality of print options and features, a user interface for the user;
receiving one or more user selections, from the user, indicating individual features of the particular plurality of print options and features that form a subset of the plurality of print options and features;
associating the particular plurality of print options and features with the particular print job to enable implementing the resource conservation mode to reduce the amount of the consumable printing resources used to print the particular print job.

16. The printing device of claim 15, wherein the one or more particular print options include one or more of: a duplex option, an n-up option, a print density option, a black-and-white option, a recyclable paper option, and a toner usage.

17. A printing device comprising:
a print manager configured to:
determine a plurality of print options and features specified to process a particular print job on the printing device;
apply one or more printing quota rules to a user account associated with the particular print job to determine whether a print quota associated with the user account has not been reached;
in response to determining that the print quota associated with the user account has not been reached:
determine whether the particular print job is available for printing on the printing device;
in response to determining that the particular print job is available for printing,
determine, from a network printing service, a particular plurality of print options and features specified to process the particular print job on the printing device;
wherein the particular plurality of print options and features is obtained by the network printing service by performing:
generating, using data indicating a plurality of print options and features, a user interface for a user;
receiving one or more user inputs, from the user, indicating the particular plurality of print options and features that form a subset of the plurality of print options and features;
associating the particular plurality of print options and features with the particular print job to enable implementing a resource conservation mode to reduce the amount of the consumable printing resources used to print the particular print job;
in response to determining that the print quota associated with the user account has been reached, cancel the particular print job and send a cancellation notification that the particular print job has been cancelled.

18. The printing device of claim 17,
wherein the print quota is also associated the printing device;
wherein the print quota is reset periodically.

19. The printing device of claim 17, wherein the print manager is further configured to:
update the print quota upon receiving a processing notification that the particular print job was processed.

20. The printing device of claim 15, further comprising one or more applications configured to:
receive the particular print job from a web service by polling the web service periodically to retrieve the particular print job, or by accepting the particular print job from the web service when the web service pushes the particular print job to the printing device;
send a job status update for the particular print job to the web service upon receiving a processing notification that the particular print job was processed.

* * * * *